United States Patent

[11] 3,632,259

[72] Inventor Virgil V. Stanciu
 Rocky River, Ohio
[21] Appl. No. 824,824
[22] Filed May 15, 1969
[45] Patented Jan. 4, 1972
[73] Assignee Tempcraft Tool & Mold, Inc.
 Cleveland, Ohio

[54] WAX INJECTION NOZZLE
 4 Claims, 5 Drawing Figs.

[52] U.S. Cl. .................................... 425/245,
 164/45, 425/461, 425/469
[51] Int. Cl. ...................................... B29f 1/03,
 B29f 1/05
[50] Field of Search ............................ 18/30 NV,
 30 NW, 30 NZ, 30 NA, 30 NB, 30 NM, 30 QB, 30
 QM, 30 QZ, 30 AM, 30 AP, 30 AR, 30 D, 30 RV;
 164/45

[56] References Cited
 UNITED STATES PATENTS

| | | | |
|---|---|---|---|
| 2,436,122 | 2/1948 | Rotsler | 18/30 QB |
| 2,878,515 | 3/1959 | Strauss | 18/30 RV |
| 3,192,299 | 6/1965 | Hendry | 18/30 AM X |
| 3,259,944 | 7/1966 | McIlvin | 18/30 QZ UX |
| 3,488,810 | 1/1970 | Gellert | 18/30 RV X |

FOREIGN PATENTS

| | | | |
|---|---|---|---|
| 1,062,169 | 3/1967 | Great Britain | 18/30 NB |

*Primary Examiner*—J. Spencer Overholser
*Assistant Examiner*—Michael O. Sutton
*Attorney*—Baldwin, Egan, Walling & Fetzer ABSTRACT: A nozzle structure is provided for injecting a flowable medium into a die or mold, specifically for injecting hot wax into a die. The nozzle structure comprises a generally tubular housing an intermediate portion of which is submerged in a reservoir of hot wax with the discharge end of the housing extending beyond the reservoir. A nozzle plug is reciprocatably mounted in the hollow of the housing with a major portion of the plug being frustoconical and coacting with a complementary portion of the housing to provide a valve. Movement of the plug toward the discharge end prevents the ejection of wax and movement of the plug in the opposite direction permits the ejection of hot wax because the hot wax in the reservoir is under pressure and there is a direct flow from the reservoir through the valve in the nozzle plug when the same is open. Because of the mating conical surfaces, the wax flow begins slowly and increases gradually and continuously to full flow. The wax flow is laminar, and turbulence and splashing of wax in the die is avoided. The nozzle contains an evacuating system, so that no wax is left in the nozzle after the injection cycle is completed. As a consequence, the wax injected into the die is always fresh from the reservoir, uniform in temperature, and uniform in viscosity. This, of course, results in a greatly improved pattern finish and appearance.

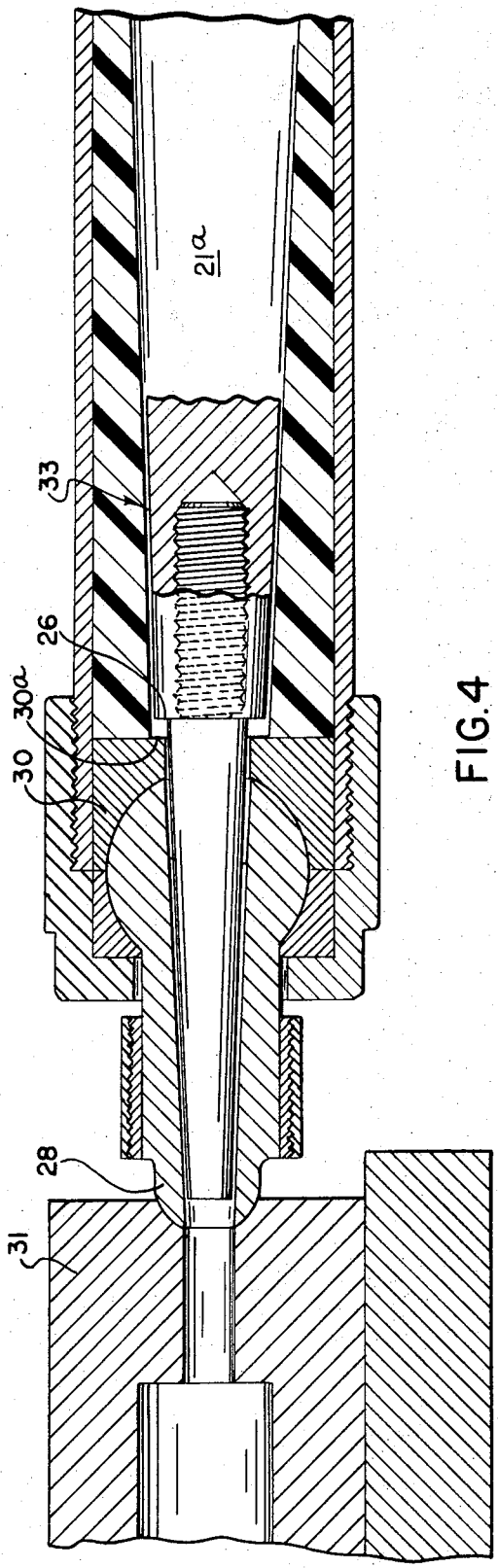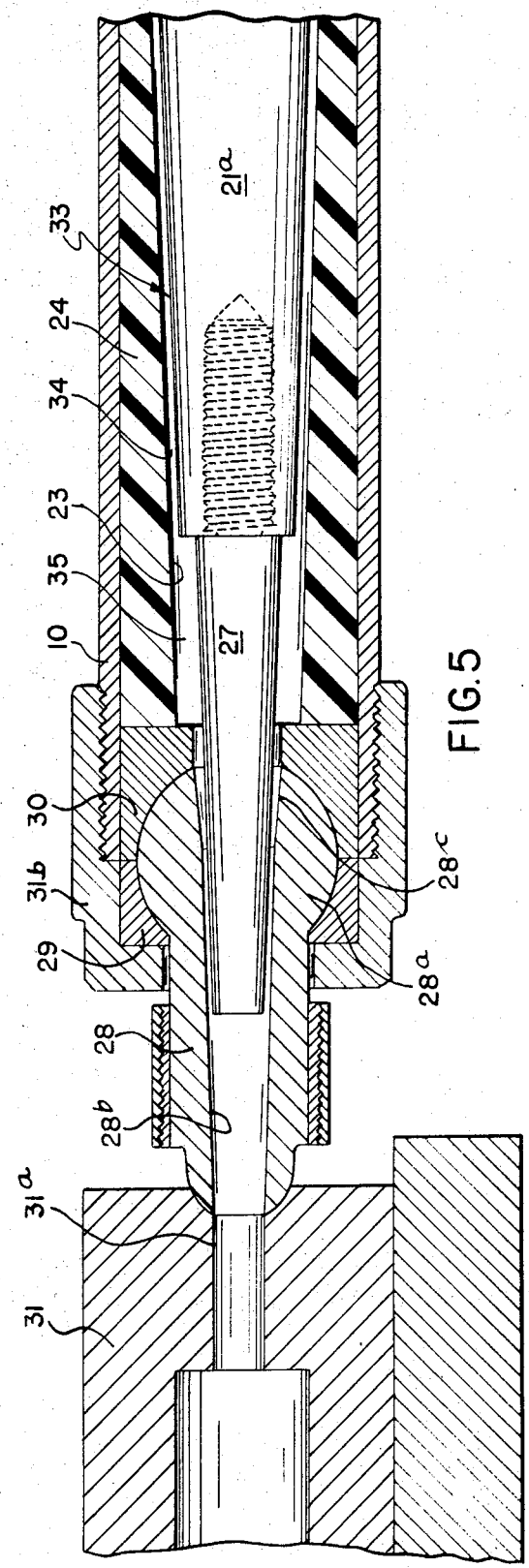

WAX INJECTION NOZZLE

This invention is directed to answering the problem of the supply of a large volume of hot wax in a single injection to a die having a large cavity. The present invention supplies such an answer using a valve of such design that a relatively small opening movement of the valve gives a rather large flow area for the hot wax moving toward the die. The present invention also supplies a means for fully evacuating the nozzle after each injection so that wax fresh from the reservoir is always injected at uniform temperature and viscosity.

Other objects and advantages of the invention will be explained in connection with the drawings and specification and the essential features thereof will be set forth in the appended claims. In the drawings, FIG. 1 is a central sectional view through the nozzle means of this invention showing the same in position in a reservoir of hot wax with the parts in a die-injecting position;

FIG. 4 is a fragmental sectional view, enlarged, taken at the left end of the nozzle means of FIG. 1 and showing the valve structure in a slightly open position; while FIG. 5 is a view similar to FIG. 4 showing the valve elements in a fully open position ready for injection.

The nozzle means of this invention are useful for the control and injection of any flowable medium but is particularly adaptable for the purpose of injecting a die with hot wax and will be so described, it being understood that this description in no way limits the invention.

Figure 1:
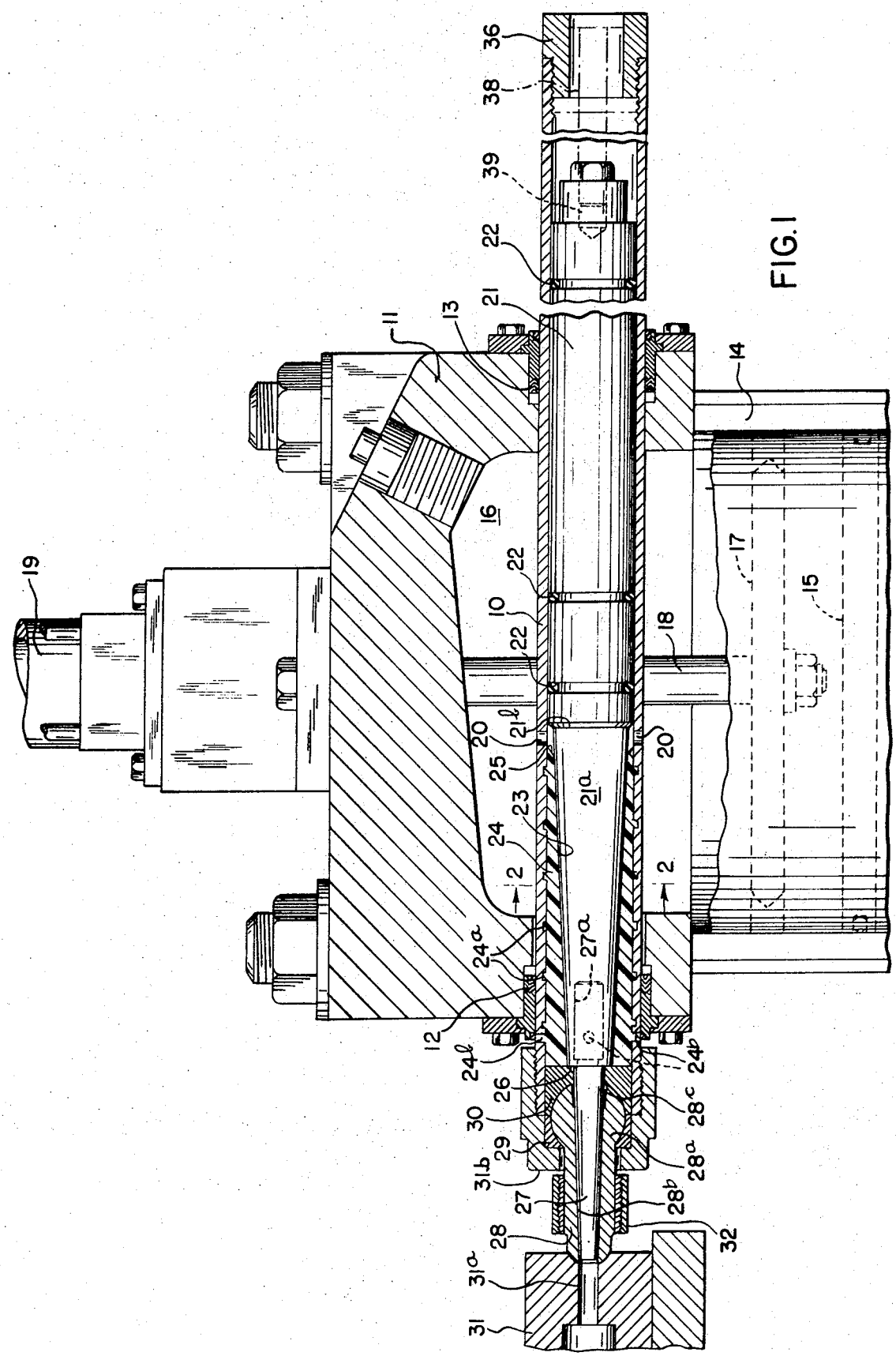

In FIG. 1, there is shown a nozzle housing 10 which is essentially hollow cylindrical tubing mounted in a reservoir head 11 for slight longitudinal reciprocation in suitable openings in the head, these being sealed at 12 and 13 to prevent leakage of hot wax at these points. The head 11 has a liquid tight connection with a generally cylindrical hot wax reservoir 14 in which there is provided a floating piston 15 urged upwardly by fluid pressure or by other suitable means so as to maintain a reservoir of hot wax under pressure in chamber 16. An agitator 17 keeps the hot wax gently agitated in its reservoir by means of a piston rod 18 connected to an hydraulic jack 19. This agitator has no relation to the present invention. The hot wax reservoir 14 with its top closing head 11, the pressure piston 15 and the agitator 17, are like those disclosed and claimed in the copending application of Virgil V. Stanciu and Jack R. Peshek, Ser. No. 683,210, filed Nov. 15, 1967, and now U.S. Pat. No. 3,535,743.

Hot wax is at all times available to the interior of the tubular housing 10 through suitable openings 20 communicating with the chamber 16 adjacent the larger diameter end of seat portion 24. The flow of the wax toward the left or discharge end of the nozzle means as shown in FIG. 1 is by means of a valving structure which will now be described.

A nozzle plug 21 has its right-hand end or main body portion as seen in FIG. 1 snugly fitted to the interior diameter of the tubular housing 10 for reciprocation therein. Suitable sealing rings 22 are provided between the nozzle plug and the housing. At the left-hand end of the housing, there is provided a valve comprising a frustoconical plug valve portion 21a which seats against a complementary frustoconical valve seat 23. This valve seat might be machined out of metal which is part of the housing 10 or of metal parts attached to the housing 10 but, preferably, the same is shown here as formed by a frustoconical element 24 of castable resin which is firmly held in position in the housing 10 by ribs 24a of the resin interfitting suitable grooves in the tubular housing and by resin 24b in gates through which the resin is injected in the fabrication thereof.

It will be noted that the valve seat terminates at 25 short of the inlet openings 20 as seen in FIG. 1, and beyond those openings an annular shoulder 21b extends outwardly and rearwardly to the full diameter of the plug 21.

At the left-hand end of plug 21, the smaller diameter of the plug valve portion 21a is connected by an annular radially extending shoulder 26 with the larger diameter end of nozzle plug tip 27 which is of frustoconical shape and is threaded at 27a into the left-hand end of the plug portion 21a.

A nozzle tip 28 extends out the left-hand end of the housing 10 and is provided with a generally spherical inner end 28a which is mounted in complementary bearing surfaces provided by the nozzle tip seat 29 combined with the nozzle tip socket 30. These parts 29 and 30 are preferably made of Teflon or its equivalent to provide ease of movement. The parts 29 and 30 are held in the position shown in FIG. 1 by means of a retainer cap 31b which is threaded upon the left-hand end of the housing tube 10. The socket member 30 has an annular shoulder opposite and complementary to the shoulder 26 on the plug portion 21a so that the parts fit in a sealing manner here to give a tight closure in the position of the parts shown in FIG. 1. The nozzle tip 28 is provided with a frustoconical surface 28b which is complementary to the surface of the plug tip 27 so as to provide a valve there. The central opening through the spherical end 28a of the nozzle tip is flared outwardly slightly as indicated at 28c so as to permit some oscillation of the generally spherical part 28a in its seat 29–30 as the nozzle tip attempts to accommodate itself to the gate 31a in the die 31 during an injection operation. If misalignment is no problem the parts 28, 29 and 30 may be made a unitary structure. An electrical heating element 32 is provided at the end of the nozzle tip to keep the same at a proper temperature and other heating devices are located as needed but they are not shown here because they form no part of the present invention.

Figure 2:
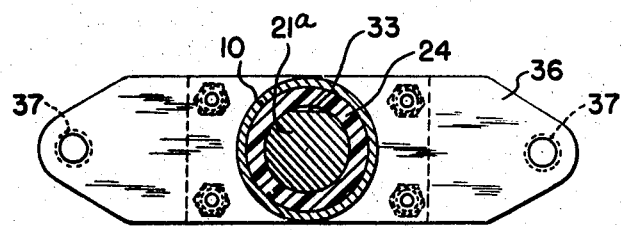
FIG. 2 is a transverse sectional view of the same taken along the line 2—2 of FIG. 1.

An escape passageway is provided to allow for the escape of hot wax which would otherwise be trapped between the plug portion 21a and the valve surface 23 as the valve closes. As best seen in FIG. 2, this escape passageway 33 takes the form of a shallow segment cut out of the frustoconical surface of the plug portion 21a, this cut providing a substantially planar surface in the plane of the chord of this segment extending from the shoulder 26 to a point adjacent, and communicating with, the inlet openings 20.

Figure 3:
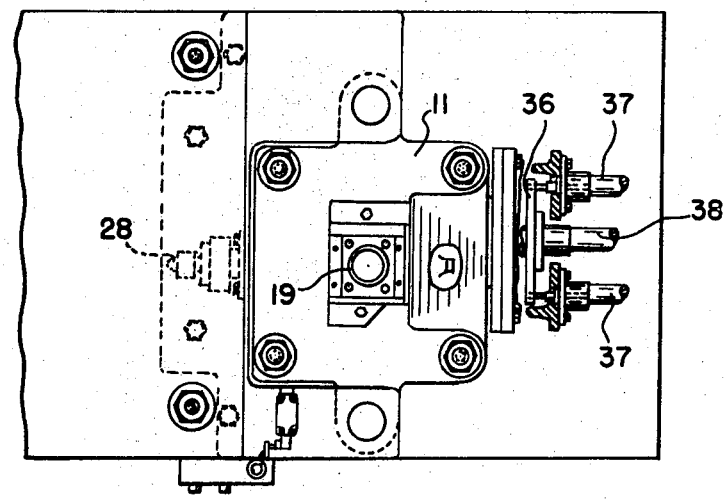
FIG. 3 is a top plan view of the apparatus of FIG. 1 on a reduced scale and indicating the connection of hydraulic jacks for the operation of the nozzle mechanism.

Referring to FIGS. 4 and 5, the valve is fully open in FIG. 5 presenting large flow areas 34 and 35 between the valve seat portion 23 and the nozzle plug portion 21a. Smaller flow areas are provided between nozzle plug tip 27 and the socket 30 and between the frustoconical surface 28b of the nozzle tip 28. In FIG. 4, the parts have approached an almost closed position where hot wax is almost enclosed between the annular shoulder 26 on the nozzle plug portion 21a and the complementary shoulder 30a on the socket 30. From this position of the parts to the fully closed position of FIG. 1 the hot wax which would otherwise be trapped and either cause insufficient closing of the valve or a dribble at the end of the nozzle tip 28, all trapped hot wax or substantially all of it, moves backward through the passageway 33 which is clearly shown in FIG. 2 and the position of which is shown by arrows in FIG. 4 and FIG. 5. This wax, which otherwise might be trapped, flows backwards in a direction opposite to the discharge direction until it reaches the inlet openings 20 communicating with the chamber 16. Means is provided for reciprocating the tubular housing 10 in the head 11. For this purpose, the housing 10, at its right-hand end as seen in FIG. 1, is threaded into an actuating plate 36 also seen in FIG. 2. Twin hydraulic jacks (not shown) are connected by their piston rods 37 to plate 36 as shown in FIG. 3. These hydraulic jacks are operated in parallel so that the piston rods work at the same moment at the same rate when it is desired to slide the tubular housing 10, in its seals 12 and 13, toward or away from a die 31.

Means is provided for reciprocating the nozzle plug 21 between the positions of FIG. 1 and FIG. 5. This is done by means of a hydraulic jack (not shown) having a piston rod 38 which extends through the actuator bracket 36 as shown in dot-dash lines in FIG. 1 and connected with nozzle plug 21 at 39 approximately on the centerline of the plug.

The operation of this invention should now be readily understood. With the nozzle valve parts in the position of FIG. 1, the housing 10 is moved by piston rods 37 to the position of FIG. 1 engaging the gate 31a in the die 31 which is to be injected. Piston rod 38 is then actuated to move the parts to the position of FIG. 5 whereupon hot wax flows through the openings 20, through the spaces 34 and 35 and between the nozzle plug tip 27 and socket 30 and the frustoconical surface 28b on the nozzle tip 28 to inject the die. At the end of the injection operation, piston rod 38 is moved in the opposite direction to move the nozzle plug from the position of FIG. 5 back to the position of FIG. 1 and to terminate the injection operation. During this closing operation of the plug valve, any trapped hot wax escapes backwardly through the escape opening 33 and is returned to the reservoir chamber 16 through the inlet openings 20.

In one embodiment of this invention, the tubular housing 10 has an internal diameter of 1 ¾ inches, the cast resin portion 24 extends for a distance of about 11 inches from socket 30 to the point 25 and the escape passageway 33 has a depth at the deepest part of the segment between one sixty-fourth inch and one thirty-second inch. In this embodiment, the smaller diameter of the plug valve portion 21a is about seven-eighth inch, and the nozzle plug tip 27 varies from a larger diameter of about nine-sixteenth inch to a smaller diameter of about three-eighth inch.

It will be noted that the long frustoconical surfaces on the plug portion 21a and its coacting seat 23, which are not quite to scale in FIG. 1, provide a large annular flow area at 34 in FIG. 5 with a relatively short longitudinal opening movement of the nozzle plug 21. Because the mating frustoconical surfaces, when relatively separated axially, provide a small opening with the first movement which enlarges gradually and continuously upon further relative movement, a smooth laminar flow of the hot wax is provided which moves into the die with little turbulence, thus avoiding splash marks and air entrapments in the wax patterns, such as occur when a valve is used which releases substantially full wax flow instantaneously.

Because all wax not injected is returned to the reservoir at the end of each cycle, the next injection is at uniform temperature and viscosity.

What is claimed is:

1. Nozzle means for injecting a flowable medium including an elongated hollow tubular housing, means providing a reservoir of said flowable medium under pressure, means mounting said housing in said reservoir with a discharge end of said housing extending beyond said reservoir, there being a discharge outlet at said discharge end, a nozzle plug reciprocatably mounted in the hollow of said housing, a rear portion of said plug having sealed engagement with said tubular housing, a forward portion of said plug providing a valve, a portion rigid with said housing providing a seat coacting with said plug portion to close said valve in one longitudinal position of said plug in said housing and to permit an opening between said valve portion and said seat portion in another longitudinal position of said plug in said housing, said valve plug and seat portions being complementary generally frustoconical surfaces converging toward said discharge outlet, there being a passage through said housing adjacent the larger end of said seat portion providing communication between said reservoir and said opening between said valve and seat portions permitting flow of said medium in a discharge direction through said passage, means preventing flow of said medium through and out of said housing except at said discharge outlet, means for reciprocating said nozzle plug in said housing between said one and said other position independently of the position of said housing, a nozzle plug tip projecting at the discharge end of said nozzle plug and concentric with and rigid with said plug, a nozzle plug tip seat embracing said tip and held by said housing, said nozzle tip and tip seat having complementary mutually engaging frustoconical surfaces converging toward said discharge outlet, an annular outwardly extending shoulder between the larger end of said tip and the smaller end of said plug, and a seat complementary to said shoulder and supported by said housing and engaged by said shoulder in said one longitudinal position of said plug.

2. Nozzle means as defined in claim 1, wherein said housing comprises cylindrical metal tubing, and said portion rigid with said housing providing a seat coacting with said nozzle plug frustoconical valve portion is of plastic material rigidly connected with said tubing.

3. Nozzle means as defined in claim 1, including a nozzle tip projecting longitudinally at the discharge end of said housing, said nozzle tip having a generally spherical inner end in said housing, a tip seat and socket complementary to said spherical end and held in engagement therewith by said housing, and said plug tip seat flared outwardly at the larger end of its frustoconical surface, whereby to permit some oscillation of said nozzle tip in said tip seat and socket.

4. Nozzle means for injecting a flowable medium including an elongated hollow tubular housing, means providing a reservoir of said flowable medium under pressure, means mounting said housing in said reservoir with a discharge end of said housing extending beyond said reservoir, there being a discharge outlet at said discharge end, a nozzle plug reciprocatably mounted in the hollow of said housing, a rear portion of said plug having sealed engagement with said tubular housing, a forward portion of said plug providing a valve, a portion rigid with said housing providing a seat coacting with said plug portion to close said valve in one longitudinal position of said plug in said housing and to permit an opening between said valve portions and said seat portion in another longitudinal position of said plug in said housing, said valve plug and seat portions being complementary generally frustoconical surfaces converging toward said discharge outlet, there being a passage through said housing adjacent the larger end of said seat portion providing communication between said reservoir and said opening between said valve and seat portions permitting flow of said medium in a discharge direction through said passage, means preventing flow of said medium through and out of said housing except at said discharge outlet, means for reciprocating said nozzle plug in said housing between said one and said other position independently of the position of said housing, and an escape passageway in the form of a shallow segment cut out of the frustoconical surface of said valve plug portion providing a substantially planar surface in the plane of the chord of said segment extending from a point near said discharge end back to the termination of said frustoconical surface on said plug portion at its larger diameter and there communicating with said reservoir, thereby permitting escape of medium trapped between said valve and seat portions in a direction opposite to said discharge direction until said valve is substantially closed.

* * * * *